(12) United States Patent
Ustuner et al.

(10) Patent No.: US 9,465,101 B2
(45) Date of Patent: Oct. 11, 2016

(54) ABERRATION CORRECTION WITH BROAD TRANSMIT BEAMS IN MEDICAL ULTRASOUND

(75) Inventors: Kutay F. Ustuner, Mountain View, CA (US); Lewis J. Thomas, Palo Alto, CA (US); D-L Donald Liu, Issaquah, WA (US)

(73) Assignee: Siemens Medical Solutions USA, Inc., Malvern, PA (US)

( * ) Notice: Subject to any disclaimer, the term of this patent is extended or adjusted under 35 U.S.C. 154(b) by 2825 days.

(21) Appl. No.: 11/099,802

(22) Filed: Apr. 5, 2005

(65) Prior Publication Data
US 2006/0241429 A1    Oct. 26, 2006

(51) Int. Cl.
| | |
|---|---|
| *G01N 29/00* | (2006.01) |
| *G01S 15/00* | (2006.01) |
| *G01S 7/52* | (2006.01) |
| *G01S 15/89* | (2006.01) |
| *G10K 11/34* | (2006.01) |

(52) U.S. Cl.
CPC .......... *G01S 7/52049* (2013.01); *G01S 7/5209* (2013.01); *G01S 7/52046* (2013.01); *G01S 7/52085* (2013.01); *G01S 15/8925* (2013.01); *G01S 15/8959* (2013.01); *G10K 11/346* (2013.01)

(58) Field of Classification Search
CPC ........... G01S 7/52046; G01S 15/8925; G01S 15/8959; G01S 7/5209; G01S 7/52085; G01S 7/52049; G01S 15/8929; G01S 15/8927
USPC ..................................... 600/443, 437; 73/602
See application file for complete search history.

(56) References Cited

U.S. PATENT DOCUMENTS

| | | | |
|---|---|---|---|
| 5,322,068 A * | 6/1994 | Thiele et al. ................. | 600/447 |
| 5,345,939 A * | 9/1994 | Engeler et al. ............... | 600/447 |
| 5,555,534 A | 9/1996 | Maslak et al. | |
| 5,570,691 A * | 11/1996 | Wright et al. ................ | 600/447 |
| 5,673,699 A * | 10/1997 | Trahey et al. ................ | 600/447 |
| 5,675,554 A | 10/1997 | Cole et al. | |
| 5,685,308 A | 11/1997 | Wright et al. | |
| 6,027,447 A * | 2/2000 | Li ................................. | 600/447 |

(Continued)

OTHER PUBLICATIONS

S.W. Flax and M. O'Donnell, "Phase-Aberration Correction Using Signals From Point Reflectors and Diffuse Scatters: Basic Principles", IEEE Trans. Ultrason., Ferroelect., Freq. Contr. vol. 35, No. 6, Nov. 1988.
R. Mallart and M. Fink, "The Van Cittert-Zernike Theorem in Pulse Echo Measurements", J. Acoust. Soc. Am., 90 (5). Nov. 1991.

(Continued)

*Primary Examiner* — Long V Le
*Assistant Examiner* — Helene Bor

(57) ABSTRACT

Aberration estimation uses cross correlation of receive-focused transmit element data. A set of sequentially fired broad transmit beams insonify an object from different steering angles. Each transmit beam emanates from an actual or a virtual transmit element. For every firing, a receive beamformer forms a transmit element image of the insonified region by focusing the received signals. An estimator estimates aberration by cross correlating or comparing the transmit element images. Where a virtual transmit element is used, the virtual transmit element images are back propagated to an actual transmit element position before aberration estimation. The estimations are used to form corrected transmit element images which are then summed pre-detection to form a high-resolution synthetic transmit aperture. Alternatively, the estimations are used to improve conventional focused-transmit imaging.

22 Claims, 1 Drawing Sheet

(56) References Cited

U.S. PATENT DOCUMENTS

| | | | |
|---|---|---|---|
| 6,059,730 A * | 5/2000 | Miwa et al. | 600/443 |
| 6,368,279 B1 | 4/2002 | Liu | |
| 6,551,246 B1 * | 4/2003 | Ustuner et al. | 600/447 |
| 6,682,487 B1 * | 1/2004 | Savord | 600/443 |
| 6,685,641 B2 | 2/2004 | Liu | |
| 6,692,439 B1 * | 2/2004 | Walker et al. | 600/443 |
| 2004/0054282 A1 * | 3/2004 | Aubry et al. | 600/437 |
| 2005/0049496 A1 | 3/2005 | Guracar | |
| 2006/0064012 A1 * | 3/2006 | Waag et al. | 600/437 |

OTHER PUBLICATIONS

D-L. Liu and R. C. Waag, "Correction of Ultrasonic Wavefront Distortion Using Backpropagation and a Reference Waveform Method for Time-Shift Compensation", J. Acoust. Soc. Amer., vol. 96, No. 2, 1994.

D-L Liu and R. Waag, "Propagation and Backpropagation for Ultrasonic Wavefront Design", IEEE Trans. Ultrason., Ferroelect., Freq. Contr., vol. 44, No. 1, Jan. 97.

D-L. Liu and R. C. Waag, "Time-Shift Compensation of Ultrasonic Pulse Focus Degradation Using Least Square Error Estimates of Time Delay", J. Acoust. Soc. Amer., vol. 95, No. 1, 1994.

\* cited by examiner

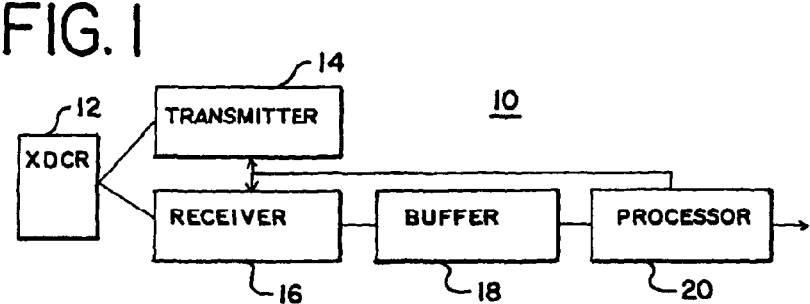
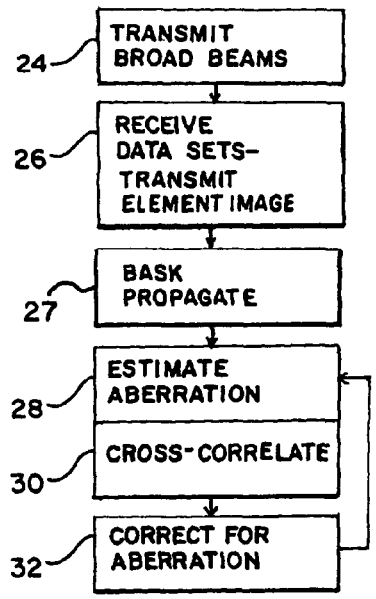
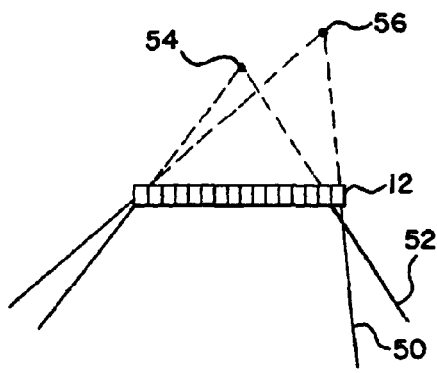
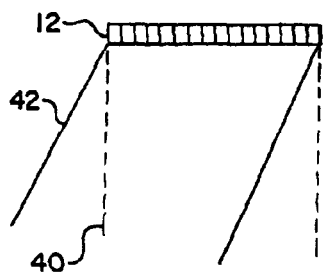
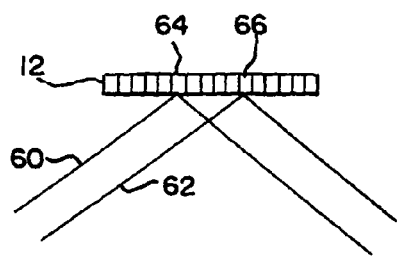

ABERRATION CORRECTION WITH BROAD TRANSMIT BEAMS IN MEDICAL ULTRASOUND

BACKGROUND

The present invention relates to aberration correction for coherent imaging systems with sampled apertures, in particular, to correction of aberration caused by tissue inhomogeneities in medical ultrasound.

Tissue inhomogeneities distort the wavefront delay, amplitude and spectral characteristics. This causes an increase in clutter and reduction in detail resolution and signal-to-noise ratio (SNR). By far the most dominant source of tissue aberration is the delay aberration. Various methods have been described for delay aberration estimation. The methods are based on transmit beams focused at the region of interest. The receive element signals received in response to a focused transmit beam are cross-correlated to estimate delay aberration. The estimated delay aberration is then used to modify the transmit and receive delay profiles for aberration correction. As an alternative to having a correlation-based estimation stage, the receive delay profiles are perturbed systematically until an image quality measure such as the root mean square amplitude of the beamformer output is maximized, such as disclosed in U.S. Pat. No. 6,368,279.

Higher correlation of the receive element signals provides better aberration estimation. If the object is incoherent (i.e., speckle generating) as most tissues are, the correlation of the receive element signals increases with better transmit focus (the van Cittert-Zernike Theorem). Therefore aberration estimation and correction steps may need to be iterated over multiple transmit events, improving the transmit focus and hence the estimation and correction at each iteration.

In cases where delay aberration can be modeled as a phase screen at a distance away from the transducer surface, the receive element signals are back propagated to the phase screen depth to increase correlation of element signals before the cross correlation. The back propagation methods: the diffraction integral method, the angular spectrum method and the shift-and-add method are described in D-L Liu and R. Waag, "Propagation and Back propagation for Ultrasonic Wavefront Design", *IEEE Trans. Ultrason., Ferroelect., Freq. Contr.*, vol. 44, no 1, January 97.

Where aberrations are distributed in space and not limited to a phase screen at the surface of the transducer, there may be more than one isoplanatic patch in the region of interest. Then, the aberration estimation and correction are repeated using additional transmit and receive events for each isoplanatic patch. Therefore, aberration correction is more time consuming for smaller isoplanatic patch sizes. Providing for more frequent or a greater number of transmit events reduces imaging frame rate.

Aberration estimation techniques that rely on focused transmit beams are not convenient to use in conjunction with imaging techniques that rely on broad transmit beams. One broad transmit beam technique is to form many parallel receive beams in response to the broad transmit beam (receive multibeam). Another broad transmit beam technique is the synthetic transmit aperture technique, such as disclosed in U.S. Pat. No. 6,551,246. The transmit aperture is synthesized by coherently summing a set of images, each formed in response to a broad transmit beam using receive multibeam. A broad transmit beam is formed typically by exciting either a single (real) transmit element, or a set of transmit elements delayed to mimic a virtual transmit element. The receive multibeam and synthetic transmit aperture techniques provide high frame rate imaging, especially for 3D. However, due to reduced degree of data redundancy, images formed with broad transmit beams are more susceptible to aberration effects. Therefore there is a need for aberration correction techniques that are convenient to use with broad transmit beams.

BRIEF SUMMARY

The preferred embodiments described below include methods and systems for estimating and correcting an aberration in a region scanned with ultrasound. The aberration estimation method is based on cross correlation of receive-focused transmit element data. This is the reciprocal of the conventional techniques which are based on cross correlation of transmit-focused receive element data. Because of the transmit/receive reciprocity, many of the conventional aberration estimation and correction techniques can easily be adapted to the new approach.

A set of elements of an actual or a virtual transmit array are fired sequentially. A virtual transmit element is formed by a set of actual transmit elements delayed to generate a wavefront that converges at the virtual element position. The virtual transmit element can be positioned behind the transducer or between the transducer and the object. For each firing, a transmit element image is generated by a receive beamformer. The receive focusing ensures that the transmit element images have sufficient mutual coherence over a large region. The transmit element images are cross-correlated to estimate a delay aberration over the whole area or volume where the images overlap. The cross correlation can be multi-dimensional (lateral as well as axial) which may improve accuracy, robustness, and spatial resolution of the aberration estimates. After being corrected for aberration, the transmit element images can be synthesized (summed coherently) to form a high resolution, low clutter synthetic aperture image. Refiring is not needed to apply the aberration correction on transmit (in addition to receive) or to iterate the aberration estimation. The echo signals received in response to the set of transmit element excitations and stored in a memory are reused.

In a first aspect, a method is provided for estimating and correcting aberration in a region scanned with ultrasound. Ultrasound beams are fired sequentially for a different real or virtual transmit element. Echoes are received and stored by a receiver. For each transmit element, an image is generated by a receive beamformer. The transmit element images share a common one-, two- or three-dimensional region. Aberration is estimated by comparing or cross correlating the transmit element images. The estimation is used to correct for transmit and/or receive beamforming using the stored echo signals without additional firings.

In a second aspect, a system is provided for estimating and correcting an aberration in a region scanned with ultrasound. A transmitter is operable to sequentially fire transmit beams from different real or virtual transmit elements. A receiver is operable to form a focused image in response to each real or virtual transmit element firing. The images share a common one-, two- or three-dimensional region. A processor is operable to estimate the aberration as a function of the images.

The present invention is defined by the following claims, and nothing in this section should be taken as a limitation on those claims. Further aspects and advantages of the invention are discussed below in conjunction with the preferred embodiments.

BRIEF DESCRIPTION OF THE DRAWINGS

The components and the figures are not necessarily to scale, emphasis instead being placed upon illustrating the principles of the invention. Moreover, in the figures, like reference numerals designate corresponding parts throughout the different views.

FIG. 1 is a block diagram of one embodiment of an ultrasound system for estimating aberrations;

FIG. 2 is a flow chart diagram of one embodiment of a method for estimating an aberration in a region scanned with ultrasound;

FIG. 3 is a graphical representation of plane waves transmitted at different angles from a transducer in one embodiment;

FIG. 4 is a graphical representation of one embodiment of unfocussed transmit beams from different virtual elements; and FIG. 5 is a graphical representation of one embodiment of diverging transmit beams from real transmit elements.

DETAILED DESCRIPTION OF THE DRAWINGS AND PRESENTLY PREFERRED EMBODIMENTS

An object, such as tissue, is insonified with broad transmit beams each emanating from a real or virtual transmit element. In response to each transmit event, a receive data set is acquired. An image, called a transmit element image, is generated by a receive beamformer using a receive data set. Delay or other aberration is estimated using the set of transmit element images.

The estimated aberration is used for aberration correction. For example, the data sets are stored and used to form aberration corrected images iteratively without additional transmit events. Alternatively, aberration corrections after a single or iterative process are applied to subsequently received data. In one embodiment, aberration corrected transmit element images associated with different real or virtual transmit elements are summed prior to detection to form a high resolution synthetic transmit aperture image.

FIG. 1 shows one embodiment of a system 10 for estimating an aberration in a region scanned with ultrasound. The system 10 is a medical diagnostic ultrasound imaging system, but other imaging or therapeutic ultrasound systems using multiple transmit or receive elements may be used. The system 10 includes a transducer 12, a transmitter 14, a receiver 16, a buffer 18, and a processor 20. Additional, different or fewer components may be provided, such as a system 10 without the separate buffer 18 or with a detector, scan converter and/or display. The transmitter 14 is shown separate from the receiver 16 in the system 10. Alternatively, the transmitter 14 and receiver 16 may be provided with some or all components in common.

The transducer 12 is an array of a plurality of elements. The elements are piezoelectric or capacitive membrane elements. The array is configured as a one-dimensional array, a two-dimensional array, a 1.5D array, a 1.25D array, a 1.75D array, an annular array, a multidimensional array, combinations thereof or any other now known or later developed array. The transducer elements transduce between acoustic and electric energies. The transducer 12 connects with the transmitter 14 and the receiver 16 through a transmit/receive switch, but separate connections may be used in other embodiments.

The transmitter 14 is a transmit beamformer, waveform generator, pulser or other wave forming device using a single channel or a plurality of channels. As a transmit beamformer, the transmitter 14 is a processor, memory, filter, waveform generator, delay, phase rotator, summer, digital-to-analog converter, amplifier, combinations thereof or any other now known or later developed transmit beamformer component. In one embodiment, the transmitter 14 is the transmit beamformer disclosed in U.S. Pat. No. 5,675,554, the disclosure of which is incorporated herein by reference. The transmit beamformer is configured as a plurality of channels for generating electrical signals of a transmit waveform for each element of a transmit aperture on the transducer 12. The waveforms are unipolar, bipolar, stepped, sinusoidal or other waveforms of a desired center frequency or frequency band with one, multiple or fractional number of cycles. The transmit beamformer includes a controller for altering an aperture (e.g. the number of active elements), an apodization profile across the plurality of channels, a delay profile across the plurality of channels, a phase profile across the plurality of channels, center frequency, frequency band, waveform shape, number of cycles and combinations thereof. Alteration of the beamforming parameters may correct for aberrations or clutter.

The transmitter 14 is operable to excite an element or multiple elements of a transducer to insonify an object with broad transmit beams. To generate a broad transmit beam, a single element of the transducer is excited, generating a spherical (or cylindrical) wavefront diverging as it propagates. Alternatively, a convex delay profile is applied to the transmit array such that a diverging wavefront (a defocused beam) emanates seemingly from a virtual element behind the transducer. If the virtual element is moved to an infinite distance from the transducer, a plane wave (an unfocused beam) is generated. FIG. 4 shows a virtual transmit element 54 or 56 positioned behind the transducer 12. Where the virtual transmit element 54 is closer to the transducer 12, the resulting broad transmit beam 52 becomes more diverging and less focused. Alternatively the transducer is focused shallower than the object creating a real "point" source in between the transducer and the object. The wavefront is a converging focused one before the object and diverging defocused one within the object. The transmit apodization profile and spectral shape of the excitation pulse may also be chosen to further shape the transmit beam.

The spacing of the (real or virtual) transmit elements that are used to form the broad transmit beams is determined by the correlation length of the aberrator. The shorter the correlation length (i.e., the higher the spatial bandwidth of the aberrator), the closer the transmit elements. Where the correlation length of the aberrator is unknown, an expected or predetermined spacing is used.

The transmit elements (real or virtual) may be fired sequentially or coded with substantially orthogonal codes and fired simultaneously. The receive signal then has to be decoded to provide as many echo data sets as the number of transmit elements fired simultaneously.

By positioning the virtual or real transmit element 54, 56 at different angles to the transducer 12, plane waves 40, 42 (FIG. 3) or diverging waves 50, 52 (FIG. 4) or 60, 62 (FIG. 5) with different angles relative to the transducer 12 are generated. Where a single element is used on transmit, the different angles are provided by firing a different element, such as sequentially transmitting from each element or every N elements for longer aberration correlation lengths, where N>1.

Each broad transmit beam covers at least a two dimensional region. The two- or three-dimensional region corresponds to a region of interest. For a plane wave, the broad transmit beam is about as wide as the active transmit aperture. For a diverging wave associated with a real or a virtual transmit element behind the transducer, the broad transmit beam is wider than the active transmit aperture for deeper depths.

The receiver 16 is a receive beamformer, a Fourier transform processor or other now known or later developed device for generating signals or samples representing the insonified region. As a receive beamformer, the receiver 16 is a preamplifier, analog to digital converter, memory, filter, delay, phase rotator, summer, processor, buffers, memory, combinations thereof or other now known or later developed receive beamformer components. In one embodiment, the receive beamformer is one disclosed in U.S. Pat. Nos. 5,555,534 and 5,685,308, the disclosures of which are incorporated herein by reference. The receive beamformer is configured into a plurality of channels for receiving electrical signals representing echoes or acoustic energy impinging on the transducer 12. The receive beamformer dynamically focuses along a plurality of scan lines in a two or three-dimensional region. Beamforming parameters including a receive aperture (e.g., the number of elements and which elements used for receive processing), the apodization profile, a delay profile, a phase profile, frequency and combinations thereof are applied to the receive signals for receive beamforming. For example, relative delays and amplitudes or apodization focus the acoustic energy along one or more scan lines. A control processor controls the various beamforming parameters for receive beam formation. A plurality of parallel receive beamformers and/or a memory for sequential application of the received data to the receive beamformer generate data representing a plurality of scan lines within the scanned region in response to a single broad transmit beam.

In another embodiment, the receiver 16 is a receiver disclosed in U.S. Pat. No. 6,685,641, the disclosure of which is incorporated herein by reference. For example, the receiver 16 uses a transform to focus image data in response to the broad transmit beam. For signals received in response to each broad beam, the receiver 16 applies a fast Fourier transform to generate image data. For broad beams normally incident to the transducer array, a two-dimensional Fourier transform is applied to data. For broad beams transmitted at other transmit angles to the transducer 12, a Fourier transform is applied to the signals of each element independently. The resulting temporal frequency data is phase shifted as a function of the transmit angle. A Fourier transform is then applied across the elements or channels to generate spatial frequency data. The Fourier transformed data is then interpolated or remapped as a function of scan angle, including the normal to the array, and any other desired variable. An inverse Fourier transform is applied to generate the image data or data set of focused data for a plurality of spatial locations. Either the Fourier transform data or the data generated by the inverse Fourier transform is combined for increased spatial resolution or a reduction in speckle.

The receiver 16 is operable to form a plurality of beams or images (transmit element images) in response to the plurality of broad transmit beams, respectively. An image includes received data whether or not the data has been or is used to generate a displayed image. The images share at least a one-, two or three-dimensional region. Each image is coherent (i.e., maintained phase information). An image may be formed by further processing beams formed by the receive beamformer, such as synthesizing (i.e., coherent combination of beams) or interpolation. For example, inter-beam phase correction is applied to one or more beams, and then the phase corrected beams are combined through a coherent (i.e., phase sensitive) filter to form synthesized ultrasound lines and/or interpolated between beams to form new ultrasound lines.

The buffer 18 is a first-in, first-out buffer, memory, corner-turning memory or other now known or later developed memory for storing data. The buffer 18 is operable to store one or more data sets for use in the processor 20.

The processor 20 is a general processor, application specific integrated circuit, field programmable gate array, digital signal processor, analog circuit, digital circuit, control processor, combinations thereof or other now known or a later developed device for estimating aberrations. The processor 20 is operable to estimate aberration as a function of two or more beams or images associated with different transmit steering angles. Where the transmit element images are acquired sequentially, the buffer 18 delays one or more of the images until all or a sub-set of the images are acquired.

A scanned area or volume is divided into a plurality of patches. The patch size is typically set equal to the likely isoplanatic patch size. For example, a two-dimensional region is divided into an 8×8 grid, providing 64 patches. The number of the patches may be greater or fewer with symmetrical or asymmetrical patches. For each patch, cross correlations of transmit element images are used to determine the delay aberration. Cross correlation of a pair of images $I_n$ and $I_m$ for the $k^{th}$ patch as a function of spatial displacement $\Delta \vec{u}$ is given by:

$$C_{n,m}^{k}(\Delta \vec{u}) = \langle w(\vec{u} - \vec{u}_k) I_n(\vec{u}) I_m^*(\vec{u} - \Delta \vec{u}) \rangle$$

where, <.> is the ensemble and/or spatial average, • is the complex conjugate, $I_n$ and $I_m$ are the images for the adjacent excited transmit element pairs. Alternatively, $I_n$ is a transmit element image and $I_m$ is the (weighted) sum of two or more transmit element images (i.e., the synthetic transmit aperture image). $w(\vec{u} - \vec{u}_k)$ is a window function located at the center $\vec{u}_k$ of the $k^{th}$ patch, with a size that is equal to the patch size. The window function may be tapered at the edges to de-emphasize the edge effects. The window function may be defined in as many dimensions as the transmit element images.

A computationally efficient alternative to the cross correlation function is the sum of absolute differences as a function of a spatial displacement $\Delta \vec{u}$:

$$D_{n,m}^{k}(\Delta \vec{u}) = \sum_{\vec{u}} \left| w(\vec{u} - \vec{u}_k)(I_n(\vec{u}) - I_m^*(\vec{u} - \Delta \vec{u})) \right|$$

where, |.| is the absolute value and $\Sigma$ is the sum over the space u.

A spatial displacement $\Delta \vec{u}_n^{k}$ that maximizes the cross correlation function, or minimizes the sum of absolute differences function is determined for each patch k and each adjacent pair of transmit element images $I_n$ and $I_{n+1}$, or pair of a transmit element image $I_n$ and the synthetic transmit aperture image. Alternatively, spatial displacement estimates can be made for non-adjacent transmit elements. A combination of various displacement estimations can be formulated as an over-determined set of equations and a least-mean square solution is sought to improve the robustness of delay estimation. Still another alternative is to form transmit element images of the same spatial patch using different receive apertures for different transmit elements: the amount of spatial shift of the receive aperture is of equal magnitude but opposite direction than the corresponding shift of the transmit elements. This technique may improve the signal coherence, and is reciprocal to the known translating transmit aperture technique disclosed in U.S. Pat. No. 5,673,699, the disclosure of which is incorporated herein.

The cross correlation or the sum of absolute differences may be performed in one, two or three spatial dimensions. For example, a one-dimensional cross correlation of images of two adjacent transmit elements may be performed along the transmit element pair axis, which is the line that connects the mid point between the transmit elements and the respective patch center. A one-dimensional cross correlation of the synthetic transmit aperture image and a transmit element image may be performed along the transmit element axis, which is the line that connects the transmit element and the respective patch center.

The processor 20 estimates a delay aberration profile $\tau^k[n]$ for each patch k. If the cross correlation is performed along the transmit element (pair) axes, the delay aberration is given by:

$$\tau^k[n] = \Delta \vec{u}_n^k / c_0.$$

Otherwise, the delay aberration is given by the dot product of the vector $\Delta \vec{u}_n^k$ with the unit vector along the respective transmit element (pair) axis $\hat{u}_n^k$:

$$\tau^k[n] = (\Delta \vec{u}_n^k \cdot \hat{u}_n^k)/c_0$$

where $c_0$ is the speed of sound used by the beamformer to calculate the geometric delay profiles.

The delay aberration values for array elements without transmit element images are determined by interpolating between the nearest elements' aberration estimates. The delay aberration profiles for spatial locations between the patch centers are determined by interpolating the nearest patches' aberration profiles.

The delay aberration profiles are subtracted from the respective geometric transmit and receive delay profiles and applied on the receive echo data sets to form the transmit- and receive-corrected transmit element images. The corrected transmit element images are summed to form synthetic transmit aperture images. Since both the transmit and receive focusing for synthetic transmit aperture are achieved by delaying the receive echo data sets, no refiring is necessary to generate transmit- and receive-corrected synthetic transmit aperture images. Alternatively, if the virtual transmit element is formed inside the medium by firing multiple actual array elements, the formation can be improved by refiring those elements with corrections based on the current aberration information, such as delay and amplitude profiles. Alternatively, the delay profiles of the transmitter 14 and/or the receiver 16 are altered as a function of the delay aberration for focused-transmit imaging (no aperture synthesis). Alternatively, the spatial displacement vectors $\Delta \vec{u}_n^k$ are used directly to shift the transmit element images. The spatially aligned transmit element images are summed to form synthetic transmit aperture images. This corresponds to transmit only aberration correction.

The acts of delay estimation and correction are repeated periodically for every N frame/volume, where N≥1, or upon user request, or automatically adaptive to changes in the imaging region.

To estimate amplitude aberration, the envelope amplitude of the transmit element images $I_n$, n=1:N, are detected (preferably after a delay aberration correction) and low pass filtered to generate $A_n(\vec{u})$. The amplitude aberration for a spatial location $\vec{u}$ is given by $$\frac{A_n(\vec{u})}{\max_n \{A_n(\vec{u})\}}$$

Various approaches, such as based on the inverse filter or matched filter principles, can be used to implement amplitude correction. For example, according to an inverse filter approach to correct for amplitude aberration, the desired receive apodization profile for spatial location $\vec{u}$ is multiplied by $$\frac{\max_n \{A_n(\vec{u})\}}{A_n(\vec{u})}$$

The amplitude correction values for array elements without transmit element images are determined by interpolating between the nearest correction estimates.

If virtual transmit elements are used to insonify the object, the aberration estimation steps above are preceded by back propagation of the transmit element images to the real transmit elements. For back propagation, the diffraction integral, the angular spectrum or the shift-and-add method is used. Based on reciprocity, transmission using a synthesized virtual transmit element and reception using a (dynamic) receiving aperture produces the same signal as transmission using a focused aperture and reception using a virtual receiving element. Since signals received by multiple virtual receiving elements form a wavefront that is away from the physical aperture, a propagation step is used to bring the wavefront to the array surface, or to any other depths, in order to obtain a better estimation of aberration. FIG. 2 shows one embodiment of a method for estimating an aberration in a region scanned with ultrasound. The method is implemented using the system 10 of FIG. 1 or a different system. The acts of FIG. 2 may be applied in a same or different order than shown. Additional, different or fewer acts may be provided. For example, the aberration is estimated in act 28 without correcting for aberrations in act 32. As another example, real transmit elements are used for transmitting broad beams as shown in FIG. 5, so the back propagation act 27 is not used.

In act 24, broad transmit beams are transmitted at different angles. The insonification is performed simultaneously with orthogonal coding or sequentially. Defocused beams, plane waves, unfocused beams, or beams focused shallower than the object insonify a region of interest, such as a two- or three-dimensional region. Each of the sequential broad transmit beams have a same or different type of focus. Each broad transmit beam corresponds to insonification from a respective real or virtual transmit element.

The different angles for the sequential broad transmit beams are provided by different locations of a real or virtual transmit element. FIG. 3 shows two different angles provided by plane waves with the transmit element at different lateral positions behind the transducer 12. FIG. 4 shows two different waves 50, 52 with different virtual transmit elements 54, 56 at different distances away from and spaced laterally relative to the transducer 12. FIG. 5 shows two different waves 60, 62 with different real transmit elements 64, 66. The different locations of the real transmit elements 64, 66 result in different angles of propagation for any given spatial location in the region of interest. The difference in angles may be a few degrees, 45 degrees, 90 degrees or other difference. Three or more broad transmit beams at 3 or more different angles may be provided. The delay and apodization profiles of the waveforms transmitted by the transducer 12 may be altered to emulate firing from the desired real or virtual transmit element where more than one element is fired.

In act 26, sets of data are received in response to the sequential transmission of broad transmit beams. The sets of data represent an overlapping two- or three-dimensional region common to each of the broad transmit beams. Different numbers of broad transmit beams may overlap different regions. The transmit element images are formed from the data sets by Fourier transform or receive beamforming. For receive beamforming, the images are formed by dynamically focusing along a plurality of scan lines through the two- or three-dimensional region. After focusing, the transmit element image has data representing spatial locations in the scanned region responsive to a particular transmit event and associated real or virtual transmit element.

In optional act 27, the transmit element images are back propagated to real transmit elements. Where real transmit elements are used in act 24, the back propagation of act 27 is not used. If virtual transmit elements are used to insonify the object, the aberration estimation in act 28 is preceded by back propagation. Since signals received by multiple virtual receiving elements form a wavefront that is away from the physical aperture, the back propagation brings the wavefront to the array surface, or to any other depths, in order to obtain a better estimation of aberration.

In act 28, one or more aberrations are estimated as a function of the acquired transmit element image information. One transmit element image is cross correlated in act 30 with another transmit element image. Alternatively, a synthetic data set is formed by coherent combination of a plurality of transmit element images. One or more transmit element images are then cross-correlated with the synthetic data set. A plurality of cross correlations is performed for a single large patch or for a plurality of smaller patches. The cross-correlation identifies a spatial displacement associated with a maximum correlation or similarity. Aberration corrections are calculated as a function of the spatial displacement as discussed above.

Delay or amplitude aberration is estimated. In one embodiment, the delay aberration is estimated with or without amplitude aberration estimation. The aberrations are estimated for each of a plurality of locations within a scan region. In yet other embodiments, a point like target is scanned for spectral aberration estimation.

In act 32, the previously acquired data sets, transmit element images, synthetic data set or a subsequently acquired data set is corrected as a function of the estimated aberration or aberrations. The aberration corrections may be applied to different combinations of previously or subsequently acquired data. In one embodiment, aberration corrections are applied to each of the received data sets. The receive data sets are then focused to form transmit element images. The aberration corrected transmit element images are synthetically combined prior to amplitude detection to form an aberration corrected synthetic transmit aperture image. Alternatively, the aberration correction is applied to a single data set.

The aberration estimation and/or corrections may be fine tuned or more accurately determined by iteratively performing the estimation and correction of acts 28, 30 and 32. As each new aberration correction is determined, the aberration correction is applied to the previously acquired and previously corrected data. Two or more iterations may reduce estimation errors.

By using broad transmit beams for aberration correction, aberration correction compatible with the synthesis of a transmit aperture from broad transmit beams along two or more directions is provided. The same data used for imaging may be used for aberration correction. High frame rate three-dimensional imaging is more likely provided using rapid scanning associated with broad transmit beams. Where the aberration corrections are applied to receive data, subsequent transmissions may be avoided for further iterations to reduce estimation error. Since the focusing is provided dynamically on receive operations, a set of transmit element images or acquired data sets provides for aberration estimation over a whole area or volume of overlap. Multi-dimensional, such as lateral and axial, correlation may be provided. By providing a lateral correlation, the accuracy and spatial resolution of aberration estimates may be improved.

While the invention has been described above by reference to various embodiments, it should be understood that many changes and modifications can be made without departing from the scope of the invention. It is therefore intended that the foregoing detailed description be regarded as illustrative rather than limiting, and that it be understood that it is the following claims, including all equivalents, that are intended to define the spirit and scope of this invention.

We claim:
1. A method for ultrasound aberration estimation, the method comprising:
    insonifying with first and second broad beams at first and second angles, respectively, from first and second excited transmit elements, the first and second broad transmit beams being diverging or unfocussed over an entire region of interest including a plurality of spatial locations;
    receiving first and second data sets of signals from a transducer, the receiving being in response to, respectively, the first and second excited transmit elements;
    focusing, by a receiver, the first and second data sets of the signals, the focusing resulting in first and second multi-dimensional images corresponding to the first and second broad beams, respectively, the first and second multi-dimensional images each representing the plurality of spatial locations;
    estimating an aberration as a function of comparing the first and second multi-dimensional images resulting from the receiver focusing; and
    correcting the first data set, the second data set, the first image, the second image, a subsequently received data set, or a subsequently focused image as a function of the aberration.
2. The method of claim 1 wherein insonifying comprises exciting the excited transmit elements sequentially.

3. The method of claim 1 wherein insonifying comprises exciting the excited transmit elements simultaneously with substantially orthogonal codes.

4. The method of claim 1 wherein insonifying comprises insonifying with the first and second excited transmit elements being first and second real transmit elements.

5. The method of claim 1 wherein insonifying comprises insonifying with the first and second excited transmit elements being first and second virtual transmit elements, respectively, the first and second virtual transmit element generated by a delayed set of real transmit elements.

6. The method of claim 5 wherein insonifying comprises insonifying with the first and second virtual transmit elements being at an infinite distance from a transducer, the first and second broad beams being planar wavefronts.

7. The method of claim 5 wherein insonifying comprises insonifying with the first and second virtual transmit elements being behind a transducer surface, the first and second broad beams being diverging wavefronts.

8. The method of claim 5 wherein insonifying comprises insonifying with the first and second virtual transmit elements being in front of a transducer and shallower than a region of interest, the first and second broad transmit beams being converging wavefronts before the region and diverging wavefronts inside the region.

9. The method of claim 1 wherein focusing comprises receive dynamic focusing.

10. The method of claim 1 wherein estimating aberration comprises estimating delay aberration, amplitude aberration, spectral aberration or combinations thereof for each of the plurality of spatial locations.

11. The method of claim 10 wherein estimating delay aberration comprises:
computing a cross correlation function of the first and second multi-dimensional images for a plurality of relative spatial displacements; and
estimating the delay aberration as a function of the spatial displacement that maximizes the cross correlation function.

12. The method of claim 10 wherein estimating the delay aberration comprises:
computing a sum of absolute differences of the first and second multi-dimensional images for a plurality of relative spatial displacements; and
estimating the delay aberration as a function of the spatial displacement that minimizes the sum of absolute differences.

13. The method of claim 10 wherein estimating the delay aberration comprises:
forming a synthetic transmit aperture image with the first and second multi-dimensional images;
computing a cross correlation function or a sum of absolute differences of the first image and the synthetic transmit aperture image for a plurality of relative spatial displacements; and
estimating the delay aberration as a function of the spatial displacement that maximizes the cross correlation function or that minimizes the sum of absolute differences.

14. The method of claim 10 wherein the amplitude and spectral aberration are estimated and corrected after the delay aberration is corrected.

15. The method of claim 1 wherein the first and second excited transmit elements are virtual transmit elements, further comprising:
back propagating the first and second multi-dimensional images to a transducer surface, the back propagation being a mathematical operation to shift a wavefront;
wherein estimating comprises estimating with the back propagated first and second multi-dimensional images.

16. The method of claim 1 wherein estimating the aberration comprises estimating delay aberration; and
wherein correcting comprises:
correcting focusing delay profiles of the first, second or both the first and second data sets as a function of the estimated delay aberration;
correcting focusing delay profiles applied on the subsequently received data set; or
combinations thereof.

17. The method of claim 16 further comprising:
iterating the estimating and correcting acts.

18. A system for ultrasound aberration estimation, the system comprising:
a transmit beamformer operable to form first and second broad transmit beams, the first and second broad transmit beams being diverging, weakly focused or unfocussed in a region of interest including a plurality of spatial locations;
a receiver operable to receive first and second data sets in response to the first and second broad transmit beams and configured to focus the first and second data sets at a plurality of spatial locations, the focus resulting in first and second multi-dimensional images corresponding to the first and second broad beams, respectively, the first and second multi-dimensional images each representing the plurality of spatial locations; and
a processor configured to estimate an aberration as a function of comparing the first and second multi-dimensional images and configured to correct as a function of the aberration.

19. The system of claim 18 wherein the transmit beamformer is operable to form the first and second broad transmit beams with different angles relative to a spatial location in a region of interest.

20. The system of claim 18 wherein the aberration is a delay aberration.

21. The system of claim 18 wherein the first and second broad transmit beams correspond to transmission from first and second real transmit elements, respectively.

22. The system of claim 18 wherein the processor is configured to correct the first data set, the second data set, a subsequently acquired data set or combinations thereof as a function of the aberration.

* * * * *